(12) United States Patent
de Ruijter (10) Patent No.: US 11,044,028 B2
(45) Date of Patent: Jun. 22, 2021

(54) APPARATUS FOR RADIO-FREQUENCY RECEIVER WITH INTERFERENCE DETECTION AND ASSOCIATED METHODS

(71) Applicant: Silicon Laboratories Inc., Austin, TX (US)

(72) Inventor: Hendricus de Ruijter, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 126 days.

(21) Appl. No.: 16/034,316

(22) Filed: Jul. 12, 2018

(65) Prior Publication Data

US 2020/0021374 A1   Jan. 16, 2020

(51) Int. Cl.
*H04B 17/345* (2015.01)
*H04L 29/06* (2006.01)
*H04B 17/318* (2015.01)
*H03G 3/30* (2006.01)

(52) U.S. Cl.
CPC ......... *H04B 17/345* (2015.01); *H03G 3/3078* (2013.01); *H04B 17/318* (2015.01); *H04L 63/1466* (2013.01)

(58) Field of Classification Search
CPC .. H04B 17/345; H04B 17/318; H03G 3/3078; H04L 63/1466
See application file for complete search history.

(56) References Cited

U.S. PATENT DOCUMENTS

| | | | |
|---|---|---|---|
| 7,864,091 B1 * | 1/2011 | Wu | H03M 1/186 341/139 |
| 8,649,287 B2 * | 2/2014 | Hwang | H04L 1/206 370/252 |
| 10,690,748 B2 | 6/2020 | Paradie | |
| 10,701,574 B2 | 6/2020 | Gormley | |
| 10,784,907 B2 | 9/2020 | Huang | |
| 10,790,916 B2 | 9/2020 | Guarin Aristizabal | |
| 2002/0137485 A1 * | 9/2002 | Nilsson | H04L 1/20 455/184.1 |
| 2004/0008614 A1 * | 1/2004 | Matsuoka | H04B 7/0848 370/203 |
| 2007/0230424 A1 * | 10/2007 | Wisherd | H04W 24/10 370/338 |
| 2012/0329415 A1 | 12/2012 | de Ruijter | |
| 2014/0064185 A1 * | 3/2014 | Abraham | H04W 40/02 370/328 |
| 2014/0078922 A1 * | 3/2014 | Xing | H04L 5/0016 370/252 |
| 2014/0370833 A1 * | 12/2014 | Din | H03G 3/3036 455/326 |
| 2016/0047915 A1 * | 2/2016 | Raasakka | G01S 19/21 342/357.59 |
| 2017/0054458 A1 * | 2/2017 | Kessel | H03G 3/3052 |

* cited by examiner

*Primary Examiner* — Nguyen T Vo
(74) *Attorney, Agent, or Firm* — Law Offices of Maximilian R. Peterson (57) ABSTRACT

An apparatus includes a radio-frequency (RF) receiver, which includes an automatic gain-control (AGC) circuit to use a gain signal to set a gain of front-end circuitry of the RF receiver. The RF receiver further includes an interference-detection circuit to use a value of the gain signal to detect an interference signal.

20 Claims, 10 Drawing Sheets

APPARATUS FOR RADIO-FREQUENCY RECEIVER WITH INTERFERENCE DETECTION AND ASSOCIATED METHODS

TECHNICAL FIELD

The disclosure relates generally to communication apparatus and associated methods. More particularly, the disclosure relates to apparatus for radio-frequency (RF) communication with interference detection, and associated methods.

BACKGROUND

With the increasing proliferation of wireless technology, such as Wi-Fi, Bluetooth, and mobile or wireless Internet of things (IoT) devices, more devices or systems incorporate RF circuitry, such as receivers and/or transmitters. To reduce the cost, size, and bill of materials, and to increase the reliability of such devices or systems, various circuits or functions have been integrated into integrated circuits (ICs). For example, ICs typically include receiver and/or transmitter circuitry.

Figure 1:
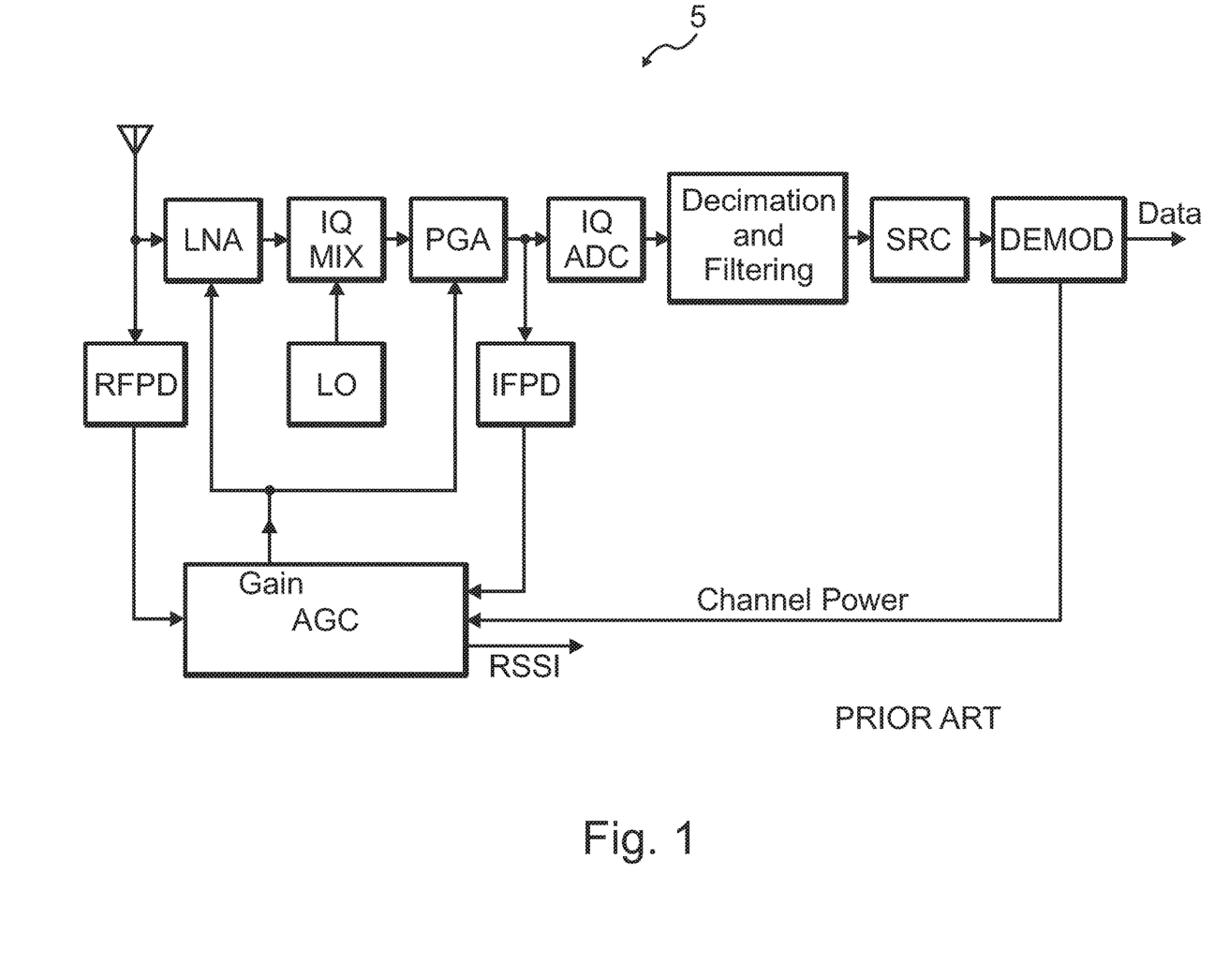
FIG. 1 shows a conventional RF receiver.

FIG. 1 shows a conventional RF receiver 5, known to persons of ordinary skill in the art. Receiver 5 includes an automatic gain-control (AGC) block. The AGC block uses the power levels of the RF and intermediate frequency (IF) signals, plus the channel power, to provide a measure of signal quality, known as received signal strength indicator (RSSI).

The description in this section and any corresponding figure(s) are included as background information materials. The materials in this section should not be considered as an admission that such materials constitute prior art to the present patent application.

SUMMARY

A variety of apparatus and associated methods are contemplated according to exemplary embodiments. According to one exemplary embodiment, an apparatus includes an RF receiver, which includes an AGC circuit to use a gain signal to set a gain of front-end circuitry of the RF receiver. The RF receiver further includes an interference-detection circuit to use a value of the gain signal to detect an interference signal.

According to another exemplary embodiment, an apparatus includes an RF receiver, which includes a packet handler circuit to provide an indication of detection of a synchronization word (sync word). The RF receiver further includes an interference-detection circuit to use an RSSI value of the RF receiver and the indication of detection of the sync word to detect an interference signal.

According to another exemplary embodiment, a method of detecting interference in an RF receiver includes detecting an interference signal by using an RSSI value of the RF receiver. The method further includes using (a) a gain signal from an automatic gain-control (AGC) circuit of the RF receiver, or (b) detection of a synchronization word (sync word) in the RF receiver to detect interference.

BRIEF DESCRIPTION OF THE DRAWINGS

The appended drawings illustrate only exemplary embodiments and therefore should not be considered as limiting the scope of the application or the claims. Persons of ordinary skill in the art will appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts relate generally to improved RF communication. More specifically, the disclosed concepts relate to apparatus for RF communication with interference detection, and associated methods.

As persons of ordinary skill in the art understand, several different interference mechanisms exist in RF communication. Examples include out-of-band (OOB) and co-channel interference.

Taking appropriate action in response to interference depends on the kind of interference experienced or present. A co-channel interferer could be counteracted by changing the RF carrier frequency of the communication link. OOB interferer may in some situations completely block communications altogether, and defeating it may entail issuing an alarm to the user or back office.

Various embodiments according to the disclosure provide interference-detection apparatus and related methods that can distinguish between in-channel and OOB interferers (which includes jammers or jamming signals). In addition to improved reliability, interference detection allows end-users to focus on the particular response to be taken (including countermeasures) when interference detection occurs, rather than detecting interference or the detection technique itself.

Various embodiments can also provide additional detail regarding the kind of interference, such as OOB interference, co-channel interference, payload interference, similar or different modulation type as desired signal, and replay attacks. Generally speaking, AGC circuitry and associated RF peak detectors (RFPDs) and intermediate-frequency peak detectors (IFPDs) are used as part of the interference-detection mechanism.

OOB interferers or interference signals typically trigger the RF peak detector causing the AGC circuitry to reduce the gain of the RF receiver's front-end circuitry. In various embodiments, OOB interference is detected when the gain reduction (as indicated by a Gain signal provided by the AGC circuitry, described below) is below a first pre-determined threshold while the RSSI (or channel power) value stays below a second pre-determined threshold.

Co-channel interference typically causes the RSSI to increase without the receiver receiving a valid packet. A co-channel interferer is detected when the RSSI (or channel power) exceeds the power of previous valid packets without successful synchronization word (sync word) or cyclic-redundancy check (CRC) detection within a pre-determined time window started after the RSSI exceeds a pre-determined threshold).

In some embodiments, the co-channel interference detection can be extended with replay attack detection by using a packet-sequence number (PSN). The co-channel interference detection can also be extended with a modulation detector to detect if the interferer has similar modulation properties or different modulation properties than the desired signals (i.e., the RF signals the user desires to receive).

Payload interference can occur when the interferer is activated during the reception of the payload. Payload interference can be detected by detecting a sudden jump in RSSI after the sync word is detected and before the end of the packet.

The modulation of the payload interference can be extended with a modulation detector to detect if the payload interferer has similar modulation properties or different modulation properties than the desired signals. Regardless of the type of detected interference, the user of the RF apparatus may be notified of not only the existence of interference, but its type. Accordingly, appropriate responses (including countermeasures) may be deployed to address the interference.

A variety of responses to interference are available, as persons of ordinary skill in the art will understand. In some embodiments, the responses may be implemented within the RF receiver. For example, in response to interference, the RF apparatus including interference detection according to various embodiments may change the RF carrier's frequency, switch channels, etc.

Figure 2:
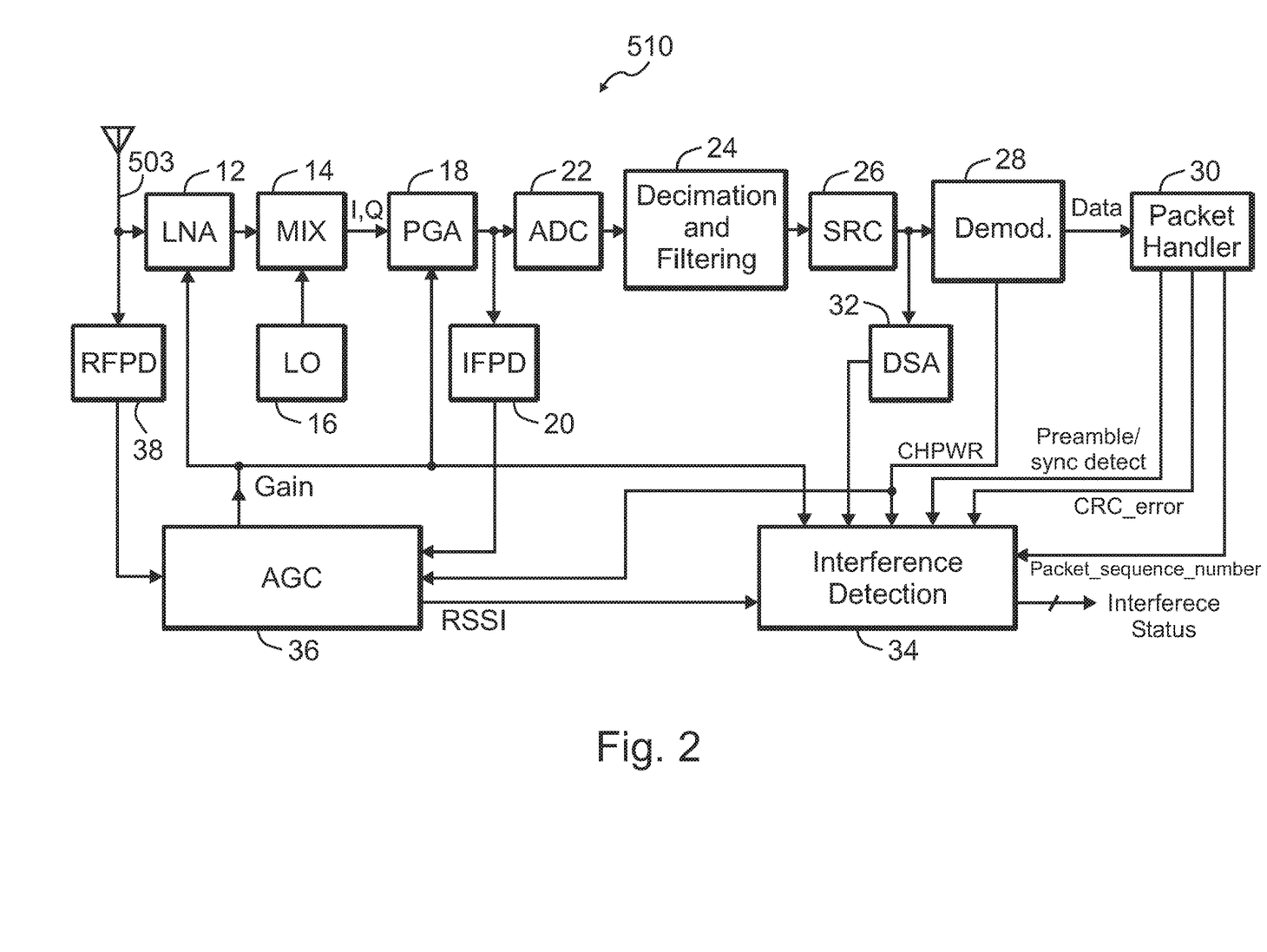
FIG. 2 shows an RF receiver according to an exemplary embodiment.

FIG. 2 shows an RF receiver 510 according to an exemplary embodiment that includes interference detection, including the detection of the type of interference. Once the type of interference has been detected, appropriate responses, such as countermeasures, may be employed.

Receiver 510 receives RF signals via an antenna. The received signals are provided to low-noise amplifier (LNA) 12, which amplifies the signals and provides the resulting signals to mix circuit or mixer 14. The gain of LNA 12 is configurable (or adjustable or programmable or adaptable or may be set) in response to a Gain signal from AGC circuit 36. AGC circuit 36 provides an RSSI signal or RSSI value to interference detection circuit 34, which is used to detect interference, as described below.

Mixer 14 mixes the output signal of LNA 12 with a signal received from local-oscillator (LO) 16 to generate in-phase (I) and quadrature (Q) signals, i.e., a complex signal. Mixer 14 provides the I and Q signals to programmable gain amplifier (PGA) 18. PGA 18 amplifies (or attenuates, as desired) the I and Q signals from mixer 14, and provides the resulting signals to analog-to-digital converter (ADC) 22. The gain of PGA 18 is configurable in response to a Gain signal from AGC 36.

ADC 22 converts the signals from PGA 18 to digital output signals, and provides those signals to decimation and filtering circuit 24. Decimation and filtering circuit 24 performs decimation on the digital signals from ADC 22. In addition, decimation and filtering circuit 24 performs filtering on those signals (or on the decimated signals), such as low-pass filtering or band-pass filtering, as desired.

The resulting signals from decimation and filtering circuit 24 are provided to sample-rate conversion (SRC) circuit 26. In a typical implementation, the demodulator uses certain oversampling ratios, as persons of ordinary skill in the art will understand, e.g., an integer oversampling ratio. Certain symbol rates combined with certain clock frequencies may result in undesired oversampling ratios. To correct the oversampling ratio, SRC 26 is used to adjust the sampling rate before the signal is provided to demodulator 28.

Demodulator 28 demodulates the signals received from SRC 26. Generally speaking, demodulator 28 includes digital circuitry, for example, digital signal processing (DSP) circuitry, used to perform processing of the digital I and Q signals received from SRC 28 in order to extract or derive the data transmitted by a transmitter (not shown) and received by RF receiver 510.

The resulting demodulated data at the output of demodulator 28 are provided to packet handler circuit 30. Packet handler circuit 30 performs various processing of the date received from demodulator 28. For example, in exemplary embodiments, packet handler circuit 30 extracts a preamble and/or synchronization (sync) detect signals from the data.

In exemplary embodiments, packet handler circuit 30 also provides a CRC error signal and a PSN. The CRC-error signal provides an indication of whether any errors or data corruption are detected or exist in the received data, as persons of ordinary skill in the art will understand. The PSN indicates the sequence number in the received data for a particular packet, and may be used to detect interference, as described below in detail. Packet handler circuit 30 can optionally add a PSN to each packet in order to facilitate detection of packet replay interference, as described below in detail.

Receiver 510 further includes digital signal-arrival (DSA) circuit 32. DSA circuit 32 detects the arrival of a transmitted signal, for example, a transmitted frame, packet, etc. Put another way, DSA 48 detects the arrival of a signal communicated via an RF link, i.e., via RF signals received by receiver 510 via the RF antenna. Upon detection of the transmitted or communicated signal (e.g., a transmitted frame, packet, etc.), DSA circuit 32 provides an output to indicate the arrival of the signal.

Receiver 510 also includes interference-detection circuit 34. As described below in detail, interference-detection circuit 34 provides the functionality of detecting interference, remedying the effects of interference, or generally reacting to interference. To do so, interference-detection circuit 34 uses signals from digital signal-arrival circuit 32, demodulator 28, packet-handler circuit 30, and AGC circuit 36.

AGC circuit 36 in turn uses signals provided by RF peak-detector (RFPD) circuit 38, IF peak-detector (IFPD) circuit 20, and demodulator 28. AGC circuit 36 provides a Gain signal to LNA 12, PGA 18, and interference-detection circuit 34. More specifically, RFPD circuit 38 accepts as an input the RF signals received by the antenna. In response, RFPD circuit 38 provides to AGC circuit 36 a signal that indicates the peak of the received RF signals. In the embodiment shown, interference detection circuit 34 Alternatively, in some embodiments, interference detection circuit 34 may use the outputs of RFPD circuit 38 and IFPD circuit 16 directly (i.e., not through AGC circuit 36) to derive its own Gain signal locally.

Referring again to FIG. 2, IFPD circuit 20 receives the output signals (I and Q) of PGA 18. In response, IFPD circuit 20 provides to AGC circuit 36 a signal that indicates the peak of the received IF signals, whose amplitude is adjusted (or varied or configured or amplified or attenuated) by PGA 18.

AGC circuit 36 also receives a signal CHPWR from demodulator 28. Signal CHPWR indicates the channel power for the received RF signal. Note that, in some embodiments, the CHPWR signal is not compensated for the RSSI signal (provided by AGC circuit 36), i.e., it is not compensated for the value of the Gain signal provided by AGC circuit 36. In general, the RSSI value provides an indication of the channel power at the antenna input at the input of LNA 12. The RSSI value is derived from the CHPWR signal (or vice-versa). To maintain a valid RSSI value, any gain change in the receiver 510, i.e., a gain change in LNA 12 or PGA 18, is compensated. For example a gain reduction of 3 dB is compensated by adding 3 dB to the CHPWR value to derive the RSSI value. In some embodiments, however, the RSSI signal provided by AGC circuit 36 may be used by undoing or compensating for the application of the Gain signal provided by AGC circuit 36.

Interference-detection circuit 34 receives input signals from AGC circuit 36 (i.e., the Gain signal and the RSSI value or signal), DSA circuit 32, demodulator 28 (i.e., signal CHPWR), and packet-handler circuit 30 (i.e., the sync word detected signal, the "CRC_error" and "Packet-sequence_number" signals). Interference-detection circuit 34 provides a multi-bit signal, collectively labeled "Interference Status" to indicate the status of the interference-detection operations, as described below in detail.

Figure 10:
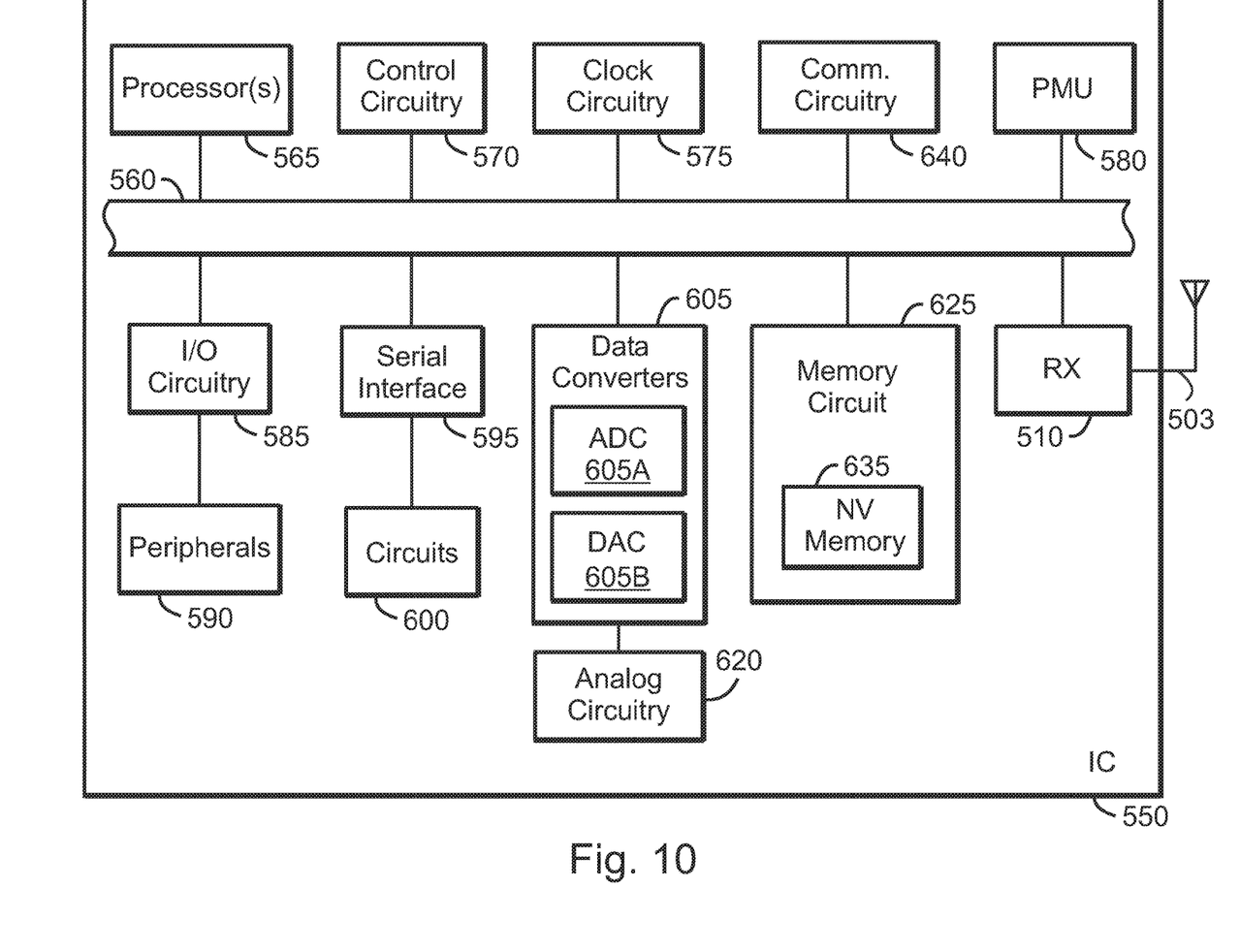
FIG. 10 shows a block diagram of an IC according to an exemplary embodiment.

Note that in various embodiments interference-detection circuit 34 may be implemented in a variety of ways, as persons of ordinary skill in the art will understand. For example, in some embodiments, interference-detection circuit 34 can be implemented by a hardware Finite State Machine (FSM), or by an MCU/processor. Since the timing is less demanding compared to demodulation and packet handler functions, an MCU/processor, for example, as shown in FIG. 10, might be a more effective solution, especially in embodiments when the MCU/processor is already part of an existing system on a chip (SoC) architecture. In other words, the functionality of interference-detection circuit 34 may be implemented completely (or partly) using an MCU/processor. In that case, no extra hardware has to be used for an FSM, and semiconductor die area can be saved. An MCU/processor plus memory is more flexible, and allows maintaining various statistics, e.g., the number of interference occurrences per day.

FIGS. 3-8 describe various interference-detection operations that may be performed according to exemplary embodiments. More specifically, the figures illustrates processes for interference detection that may be performed by RF apparatus according to various embodiments, such as receiver 510 shown in FIG. 2. The various operations in the processes shown in FIGS. 3-8 may be performed by using corresponding or appropriate block(s) in receiver 510.

For example, the value of the Gain signal may be set by AGC circuit 36. As another example, the value of the "RSSI" signal may be provided by AGC circuit 36. As another example, the interference-detection operations may be performed by interference-detection circuit 34, and the status of such determinations may be provided via the Interference Status signal, described above, and so on.

One aspect of the disclosure relates to detecting OOB interference. When OOB interference is present, the AGC in the receiver (e.g., AGC circuit 36 in receiver 510 of FIG. 2) will reduce the value of the Gain signal (essentially, the front-end gain of the receiver) based on the outputs of RFPD circuit 38 and/or IFPD circuit 20.

The receiver, however, loses sensitivity when the front-end gain is reduced. Under some situations, if the front-end gain is forced to a too-low value, the receiver may be unable to receive the desired signals. This scenario may come about because of malicious attackers, by using a deliberately applied interference signal.

To avoid the gain reduction resulting from a strong co-channel interferer, the channel power is measured (e.g., using the CHPWR signal from demodulator 28). The channel power is similar to the RSSI value with the difference that channel power is not compensated for front-end gain reductions via the Gain signal. With an adapted threshold TH2, the RSSI value can also be used by the interference detection circuit 34. Thus, knowing the value of the Gain signal, one may derive the RSSI value from the CHPWR value, and vice-versa.

Relatively strong OOB power may reduce the channel power because of reduction in front-end gain, i.e., either a reduction in the value of the Gain signal or a reduction in the value of the Gain signal combined with saturation of the front-end circuitry (e.g., LNA 12, PGA 18, etc.). As persons of ordinary skill in the art will understand, saturation of the front-end circuitry of the receiver occurs when the interfering signal exceeds the linear range of the receiver.

When the channel power, as indicated for example by the CHPWR signal, stays below a certain threshold and the Gain value (value of the Gain signal) is below another certain threshold for a certain period of time, an OOB interference is detected. The certain period of time may be the minimum time needed for an interferer to corrupt the packet, e.g. a few symbol periods.

Figure 3:
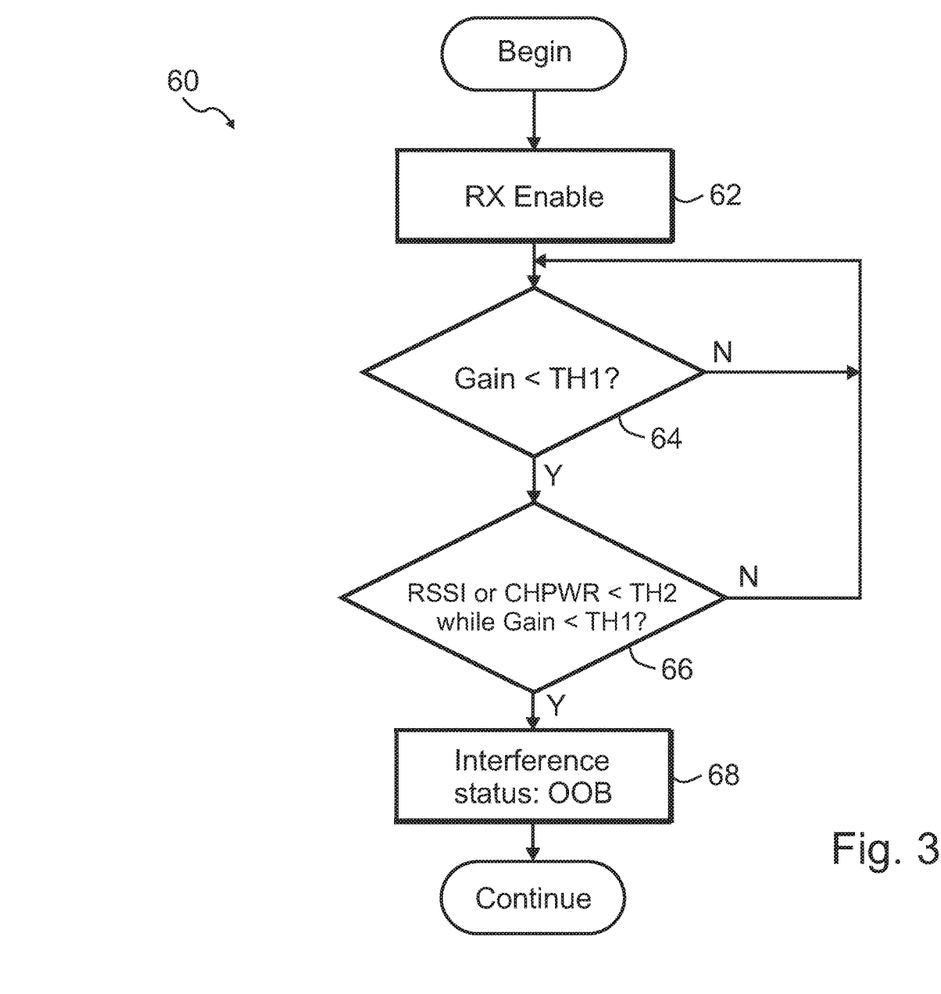
FIG. 3 shows a flow diagram for a process for interference detection according to an exemplary embodiment.

The following description provides details of some of the functionality of interference detection circuit 34. As noted above, knowing the value of the Gain signal, one may derive the RSSI value from the CHPWR value, and vice-versa. Thus, interference detection engine 34 can use either the RSSI value or the CHPWR value in its operations. To denote this feature, FIGS. 3-6 indicate that either the RSSI value or the CHPWR value may be used in interference detection by using the notation "RSSI or CHPWR" or "CHPWR or RSSI" (e.g., in comparing either the RSSI value or the CHPWR value to a threshold, etc. FIG. 3 shows a flow diagram for a process 60 for interference detection according to an exemplary embodiment. Process 60 may be used to detect OOB interference.

Referring to FIG. 3, at 62, RF reception (RX) is enabled, for example by enabling receiver 510 in FIG. 2. Referring again to FIG. 3, at 64 a check is made whether the value of the Gain signal (see FIG. 2) is less than a threshold, TH1. If not, control returns to 64 to perform another check. If, however, the value of the Gain signal is less than threshold TH1, at 66 a check is made on the value of the RSSI signal or the CHPWR signal. The Gain signal may be the total gain or, more specifically, the gain of LNA 12. Gain reduction in LNA 12 or attenuators (not shown in FIG. 2) in front of LNA 12 typically contribute to RFPD triggering by OOB blockers or interference. Specifically, the value of the RSSI signal or the CHPWR signal is compared to a threshold TH2.

If the value of the RSSI signal or the CHPWR signal is not less than threshold TH2, control returns to 64. If, however, the value of the RSSI signal or the CHPWR signal is less than threshold TH2 while the value of the Gain signal is less than threshold TH1, control passes to 68. At 68, the value of the Interference Status signal is set to indicate OOB interference.

If the OOB interferer persist over a period of time ($T_{OOB\text{-}interferer}$) than some type of action may be optionally performed. For example, the user of the RF apparatus may be informed of the OOB interference detection, as desired.

Another aspect of the disclosure relates to detecting co-channel interference. Typically, detection of desired signals is possible if the received power of the desired signal is sufficient to overcome the co-channel interference. Strong enough co-channel interferers may make it impossible for the receiver to detect the desired signals. This outcome may be the goal of malicious attackers.

The co-channel interference detection verifies the channel power (RSSI may also be used). When it exceeds a certain threshold, it might either indicate a desired signal or a co-channel blocker. If channel power stays below this threshold, there is likely no imminent treat from co-channel interferers. A timer or filter may be used to prevent triggering on noise spikes. For example, the receiver's circuitry might wait until the value of the CHPWR signal or the RSSI signal exceeds the threshold for longer than a period, say, T μs, before it proceeds to the next operation (e.g., wait for sync-word detection).

Figure 4:
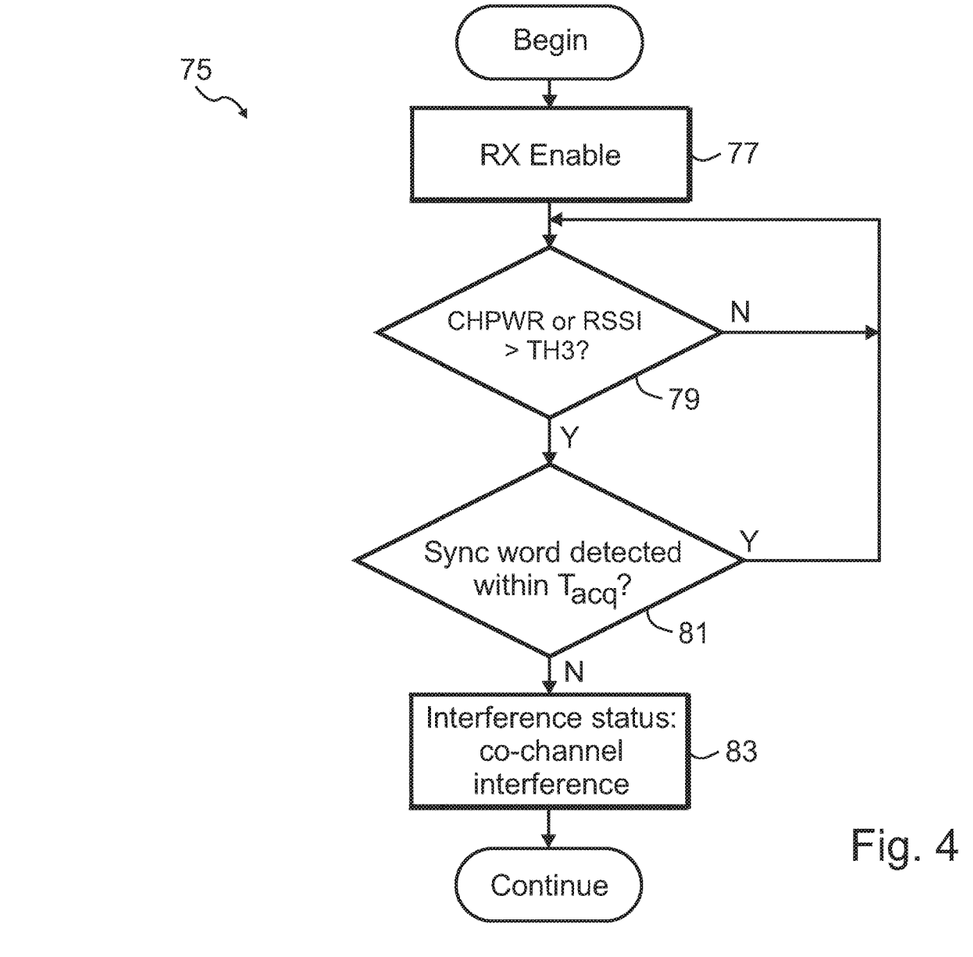
FIG. 4 shows a flow diagram for a process for interference detection according to another exemplary embodiment.

FIG. 4 shows a flow diagram for a process 75 for co-channel interference detection according to an exemplary embodiment. Referring to FIG. 4, at 77, RF reception (RX) is enabled, for example by enabling receiver 510 in FIG. 2. Referring again to FIG. 4, at 79, a check is made to determine whether the value of the RSSI signal or the CHPWR signal exceeds a certain threshold, TH3. If not, control returns to 79.

If, however, the value of the RSSI signal or the CHPWR signal exceeds TH3, at 81 a check is made whether the sync word is detected within a certain period, $T_{acq}$. More specifically, to check if the elevated level of the RSSI signal or the CHPWR signal is from an co-channel interferer or from a desired channel, the interference detector (e.g., interference-detection circuit 34) waits until a sync word is received.

If the sync word is detected within the period $T_{acq}$, the packet will be received, after which control returns to 79. If not, i.e., if the sync word is not detected within the period $T_{acq}$, then the receiver is likely to be receiving an undesired co-channel interferer. In this situation, at 83 the value of the Interference Status signal is set to indicate co-channel interference.

In exemplary embodiments, the period $T_{acq}$ should be at least long enough to allow for sync word detection. In some embodiments, longer periods may be used so that interference detection will not occur on relatively short interference bursts, e.g., from Wi-Fi transmitters. In some embodiments, the channel power is detected relatively shortly after the packet arrives. Assuming a desired packet has arrived, the sync word should be detected after the time it takes to receive the preamble and the sync word. In other words, in such situations, $T_{acq}$ should be at least as long as the quantity $T_{preamble} + T_{sync-word}$, where $T_{preamble}$ denotes the time it takes to receive the preamble and $T_{sync-word}$ represents the time it takes to receive the sync word, respectively.

Alternatively, in some embodiments, the sync word detection could be replaced or enhanced with valid packet detection, e.g., CRC pass or CRC detection (i.e., whether the CRC value is valid). Using CRC detection allows also detecting payload attacks, where the interferer is activated synchronously after the sync word. The payload and the CRC value may also be encrypted to make it harder for the attacker to spoof the payload and to pass CRC validation.

In some embodiments, if the co-channel interferer persist over a period of time, say, $T_{co-ch-interference}$, then the user may be notified, as desired. For example, if the co-channel interferer persist long enough to corrupt a packet, or long enough to suspect a malicious attack, e.g., longer than, say, 10 seconds. In yet another embodiment, the occurrences of reaching the co-channel interference status at 83, could be counted, thus forming a measure of occurrence density. For example, the user may be notified if the number of occurrences increases a threshold in a certain amount of time, say 1 minute. In some embodiments, co-channel interference-detection may also be used as a trigger for the network to change its operating frequency, for example, in Automatic Frequency Agility (AFA) RF communication systems.

Intermodulation may also result in reaching the co-channel interference status at 83, for example, when two interferers are spaced apart by $F_{space}$ and where the closest interferer is spaced apart by $F_{space}$ from the desired receive frequency. Third-order distortion (e.g., in LNA 12) may give rise to a 3rd order intermodulation (IM) component at the desired receive frequency. In order to distinguish between a single carrier interferer or an intermodulation component, an additional test may be performed to make such a determination. For example, in some embodiments, when the co-channel interference status is reached at 83, the gain in front of LNA 12 may be reduced, e.g., by an attenuator. If the co-channel energy is caused by intermodulation, then the CHPWR value (or the RSSI value) should be reduced by more than the gain step. For example, a 3rd order IM component may vary by $A^3$, where A is the signal amplitude of each of the interferers. As a specific example, a gain reduction of 2 dB may lead to a CHPWR reduction of 6 dB, thus indicating an IM interferer. If the CHPWR value reduces by about 2 dB, then this scenario would indicate a co-channel interferer. Similar processes may be applied to the RSSI value, instead of the CHPWR value, because one may be derived from the other (by interference detection circuit 34), as noted above.

Note that in some embodiments the threshold TH3 may be dynamic, based on CHPWR or RSSI values from previous valid packets. For example, if the channel power (e.g., as indicated by the CHPWR signal or the RSSI signal) from the last certain number of valid packets (e.g., the last 100 valid packets) is between −70 and −40 dBm (storing minimum values of the CHPWR signal (or the RSSI signal)), then the value of TH3 may be set to −70 dBm-6 dBm (for margin), or −76 dBm.

Note also that higher CHPWR values (or RSSI values) without proper synchronization-frame delimiter (SFD) or CRC detection (or other indications of error) are relatively strong indications of malicious attacks. Accordingly, in some embodiments, the user may be informed of the relatively strong probability of malicious attacks.

Figure 5:
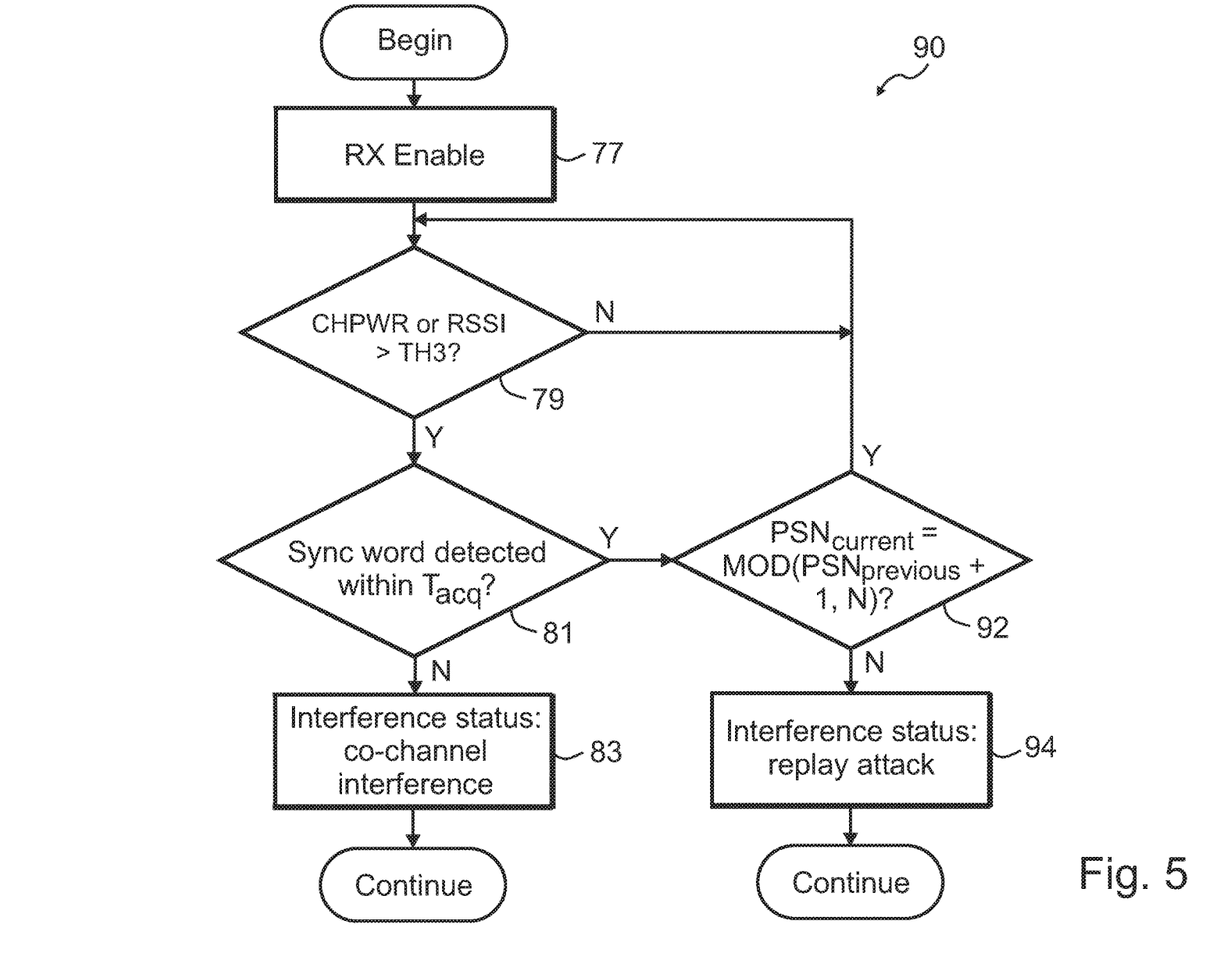
FIG. 5 shows a flow diagram for a process for interference detection according to another exemplary embodiment.

FIG. 5 shows a flow diagram for a process 90 for interference detection according to another exemplary embodiment. More specifically, process 90 provides detection of co-channel interference, similar to the embodiment illustrated in FIG. 4. Referring again to FIG. 5, blocks 77, 79, 81, and 83 (which also exist in FIG. 4) are used for that purpose. For example, at 79, either the value of the CHPWR signal or the value of the RSSI signal may be compared to TH3, as desired, and as noted above.

The embodiment in FIG. 5, however, can additionally detect interference in the form of replay attack. More specifically, replay attack can be detected by adding a PSN to each packet, for example, by using packet handler circuit 30, described above. For a given packet, bookkeeping of one or more previous PSNs may be used in the situation where RF communication traffic involves more than one source, i.e., more than one transmitter, etc. Generally, to detect replay attacks, the receiver (e.g., receiver 510) maintains a list of previous PSNs ($PSN_{previous}$) for each of the sources with which it communicates.

Referring again to FIG. 5, the process for replay attack detection is illustrated as example with respect to the IEEE 802.15.4 specification. In the IEEE 802.15.4 specification, an optional sequence number is specified in the media access control (MAC) header. The sequence number is incremented in modulo N fashion, in which N equals 8 in the IEEE 802.15.4 specification. As persons of ordinary skill in the art will understand, however, the process may be used with other specifications and/or protocols by making appropriate modifications that take into account the details and procedures embodied in a particular specification and/or protocol.

To detect replay attack, at 81, a check is made whether the sync word is detected within a certain period, $T_{acq}$, as described above. If the sync word is not detected, at 83 the Interference Status signal is set accordingly (to indicate co-channel interference). If, on the other hand, the sync word is detected within the period $T_{acq}$, control passes to 92. At 92, the current PSN ($PSN_{current}$), i.e., the PSN for the current packet under examination, a check is made whether $PSN_{current}$ equals $MOD(PSN_{previous} +1, N)$, where "MOD" represents the modulo operation. If so, control returns to 79. If not, at 94 the value of the Interference Status signal is set to indicate interference in the form of replay attack.

Figure 6:
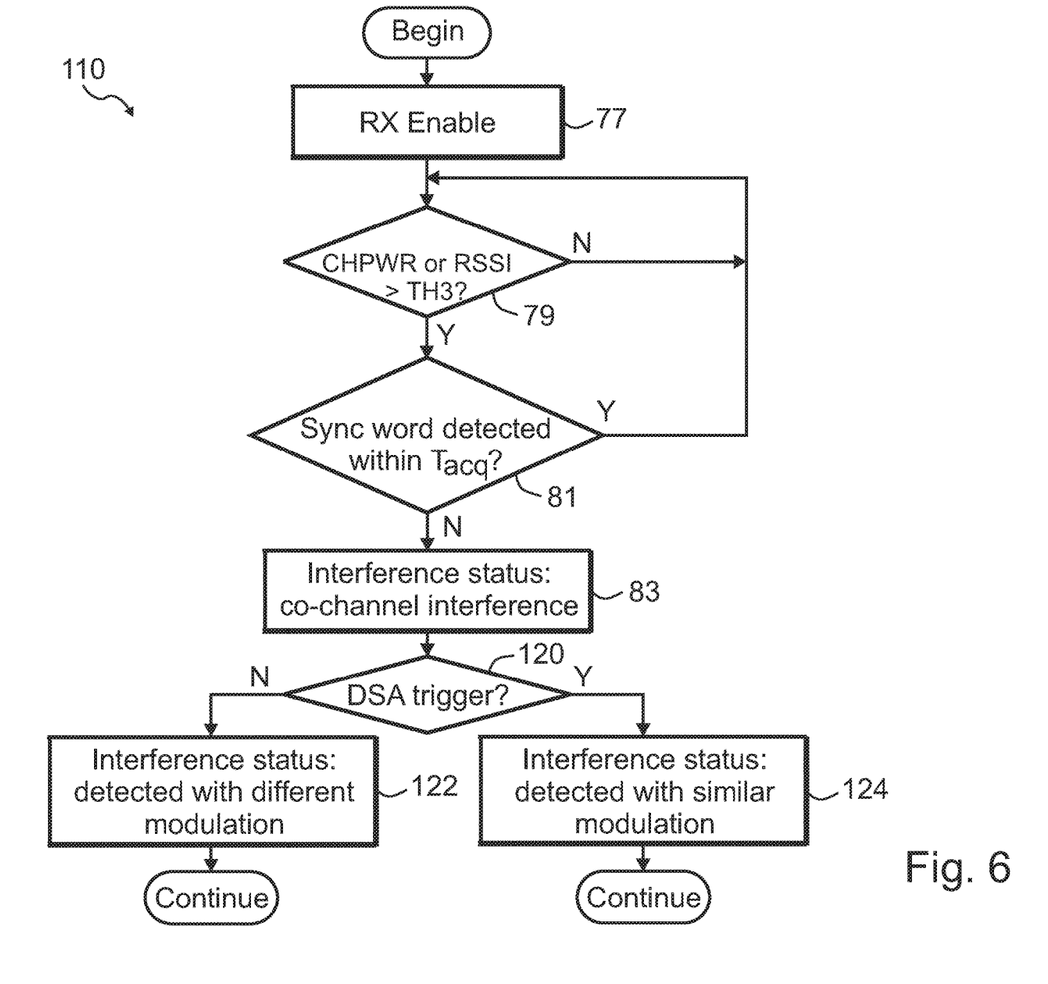
FIG. 6 shows a flow diagram for a process for interference detection according to another exemplary embodiment.

FIG. 6 shows a flow diagram for a process 110 for interference detection according to another exemplary embodiment. More specifically, the embodiment in FIG. 6 can detect not only co-channel interference, but also whether the interference signal uses the same modulation scheme as the desired signal or a different modulation scheme.

Process 110 provides detection of co-channel interference, similar to the embodiment illustrated in FIG. 4. Referring again to FIG. 6, blocks 77, 79, 81, and 83 (which also exist in FIG. 4) are used for that purpose. For example, at 79, either the value of the CHPWR signal or the value of the RSSI signal may be compared to TH3, as desired, and as noted above.

The embodiment in FIG. 6, however, can additionally detect whether the interference signal uses the same modulation scheme (or type) as the desired signal or a different modulation scheme. As noted above, at 83 the Interference Status signal is set accordingly (to indicate co-channel interference). Control then passes to 120, where a check is made whether a DSA trigger exists, which would indicate the arrival of a signal to be processed by the various blocks of receiver 510, as described above.

If a DSA trigger exists, it indicates that the interferer signal uses the same or similar modulation scheme as the desired signal. Accordingly, at 124 the Interference Status signal is set to indicate that the interferer uses the same or similar modulation scheme as the desired signal. If a DSA trigger does not exist, however, at 122 the Interference Status signal is set to indicate that the interferer uses a different modulation scheme than does the desired signal.

In various embodiments, the modulation scheme used by the interferer can be checked by examining the frequency deviation, spike detection, modulation rate, etc., as persons of ordinary skill in the art will understand. An example of a system that might be used to perform those operations is described in U.S. Patent Publication No. 2015/0030061 to de Ruijter et al.

For example, if the interferer is using a different modulation or even a continuous wave (CW) signal, the interference detection is more likely related to a source from outside the desired network. In some embodiments, if the interferer with different modulation persist over a period of time, say, $T_{dif\text{-}mod}$, then appropriate or desired action may be taken, e.g., a user may be notified.

Note that a similar modulation scheme could indicate a missed packet. An accidental miss does not necessarily mean that a malicious attack is taking place or has been attempted. Thus, in some embodiments, if the similar-modulation condition persist over a period of time, say, $T_{similar\text{-}mod}$, without any successful packet being received by receiver 510 (e.g., no valid CRC indication), then appropriate or desired action may be taken, e.g., a user may be notified.

Typically, a different modulation scheme is more likely to be an undesired interferer. Thus, in some embodiments, the time period $T_{dif\text{-}mod}$ is selected such that $T_{dif\text{-}mod} < T_{similar\text{-}mod}$.

Figure 7:
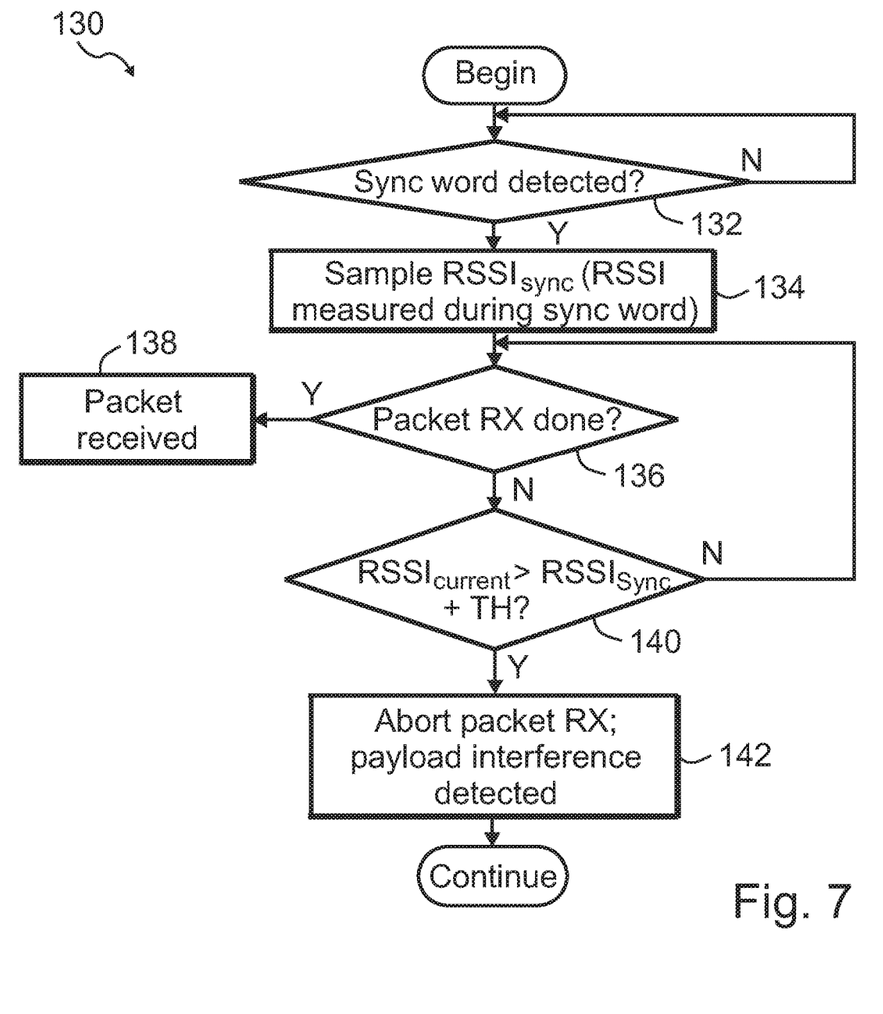
FIG. 7 shows a flow diagram for a process for interference detection according to another exemplary embodiment.

FIG. 7 shows a flow diagram for a process 130 for interference detection according to another exemplary embodiment. More specifically, process 130 detects co-channel payload interference, i.e., a co-channel interferer that corrupts or affects or renders invalid one or more packets in the desired signal.

At 132, a check is made whether the sync word has been detected. If not, control returns to 132 to continually check for sync word detection. When sync word is detected, control passes to 133, where a quantity $RSSI_{sync}$ is sampled (or measured or obtained). The quantity $RSSI_{sync}$ refers to the RSSI value sampled during the detection of the sync word. At 136, a check is made whether packet reception is done or finished. If so, at 138 an indication is made that the packet has been received successfully.

If not, at 140 a check is made whether the current RSSI value, $RSSI_{current}$, exceeds the sum of the RSSI value sampled during sync word (or SFD) detection ($RSSI_{sync}$) and a threshold value. If not, control returns to 136; otherwise, at 142 packet reception is aborted, as payload interference is detected. The value of the Interference Status signal may be set to indicate co-channel interference with payload interference, or co-channel payload interference. Note that in some embodiments, after aborting packet reception at 142, the receiver may transition to 132 to attempt reception of the interfering packet.

Figure 8:
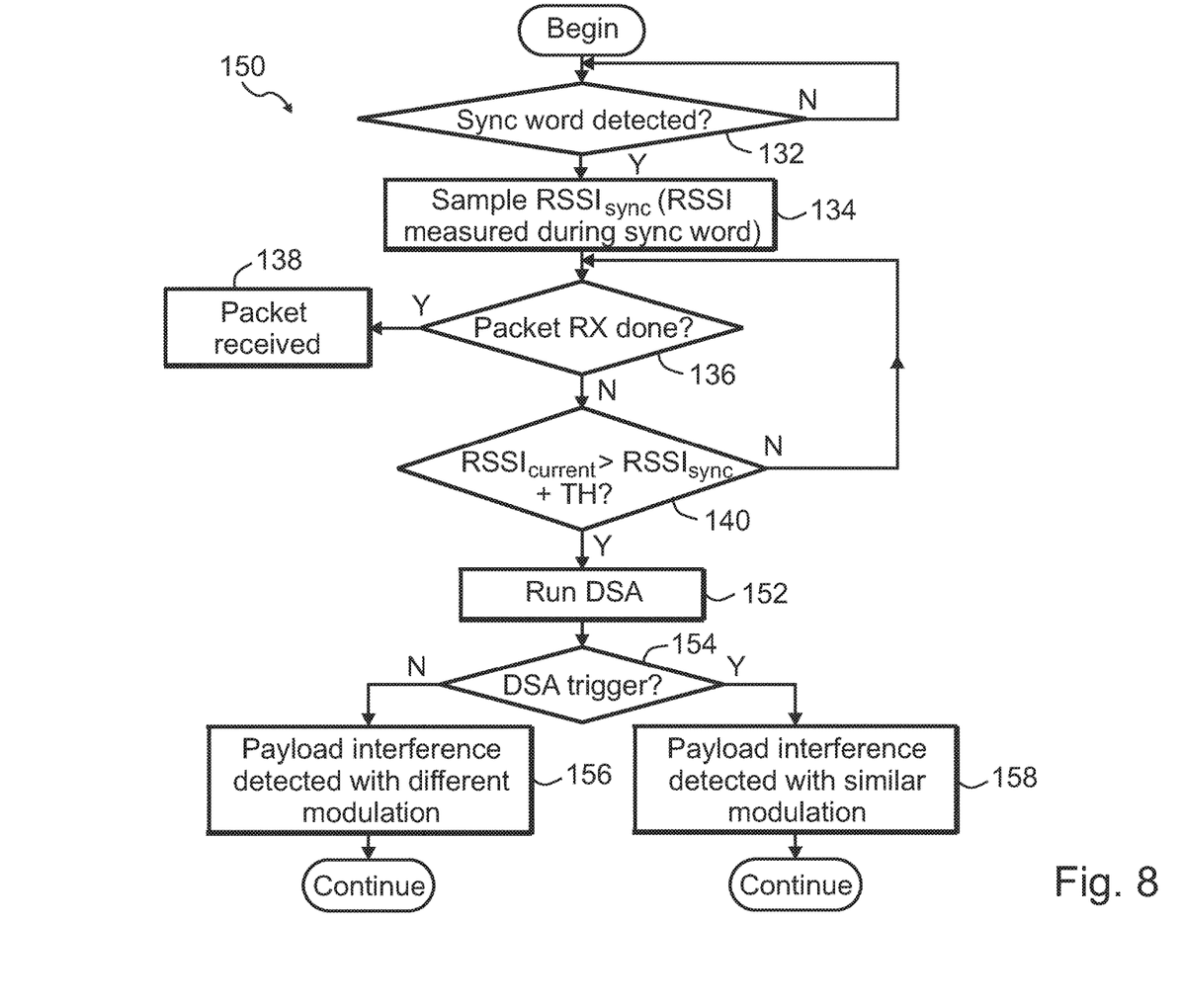
FIG. 8 shows a flow diagram for a process for interference detection according to another exemplary embodiment.

FIG. 8 shows a flow diagram for a process 150 for interference detection according to another exemplary embodiment. Process 150 provides detection of co-channel payload interference, similar to the embodiment illustrated in FIG. 7. Referring again to FIG. 8, blocks 132, 134, 136, 138, and 140 (which also exist in FIG. 7) are used for that purpose.

The embodiment in FIG. 8, however, can additionally detect whether the interference signal uses the same modulation scheme (or type) as the desired signal or a different modulation scheme. To do so, at 152, DSA circuit 32 is run. At 154, a check is made whether a DSA trigger exists, which would indicate the arrival of a signal to be processed by the various blocks of receiver 510, as described above.

If a DSA trigger exists, it indicates that the payload-interferer signal uses the same or similar modulation scheme as the desired signal. Accordingly, at 158 the Interference Status signal is set to indicate that the payload interferer uses the same or similar modulation scheme as the desired signal. If a DSA trigger does not exist, however, at 156 the Interference Status signal is set to indicate that the payload interferer uses a different modulation scheme than does the desired signal.

As noted, the above processes may be carried out or performed using a variety of RF communication apparatus.

As merely one example, such RF communication apparatus may be receiver 510 illustrated in FIG. 2 and described above. As persons of ordinary skill in the art will understand, however, other RF communication apparatus having the appropriate capabilities may be used, as desired.

Furthermore, a variety of time periods described above, such as $T_{acq}$, $T_{co\text{-}ch\text{-}interference}$, $T_{similar\text{-}mod}$, and $T_{dif\text{-}mod}$ are used in various embodiments. The exact value of the time periods used in a particular implementation depends on a variety of factors, as persons of ordinary skill in the art will understand. Such factors include design specifications, performance specifications, cost, available technology, target markets, target end-users, etc. The time periods may be selected through analysis of a given target implementation, simulation, empirical studies, the type, level, and frequency of interference in a given situation, etc., as persons of ordinary skill in the art will understand.

In addition, a variety of threshold values described above, such as TH, TH1, TH2, and TH3 are used in various embodiments. The exact threshold values used in a particular implementation depends on a variety of factors, as persons of ordinary skill in the art will understand. Such factors include design specifications, performance specifications, cost, available technology, target markets, target end-users, etc. The threshold values may be selected through analysis of a given target implementation, simulation, empirical studies, the type, level, and frequency of interference in a given situation, etc., as persons of ordinary skill in the art will understand.

Figure 9:
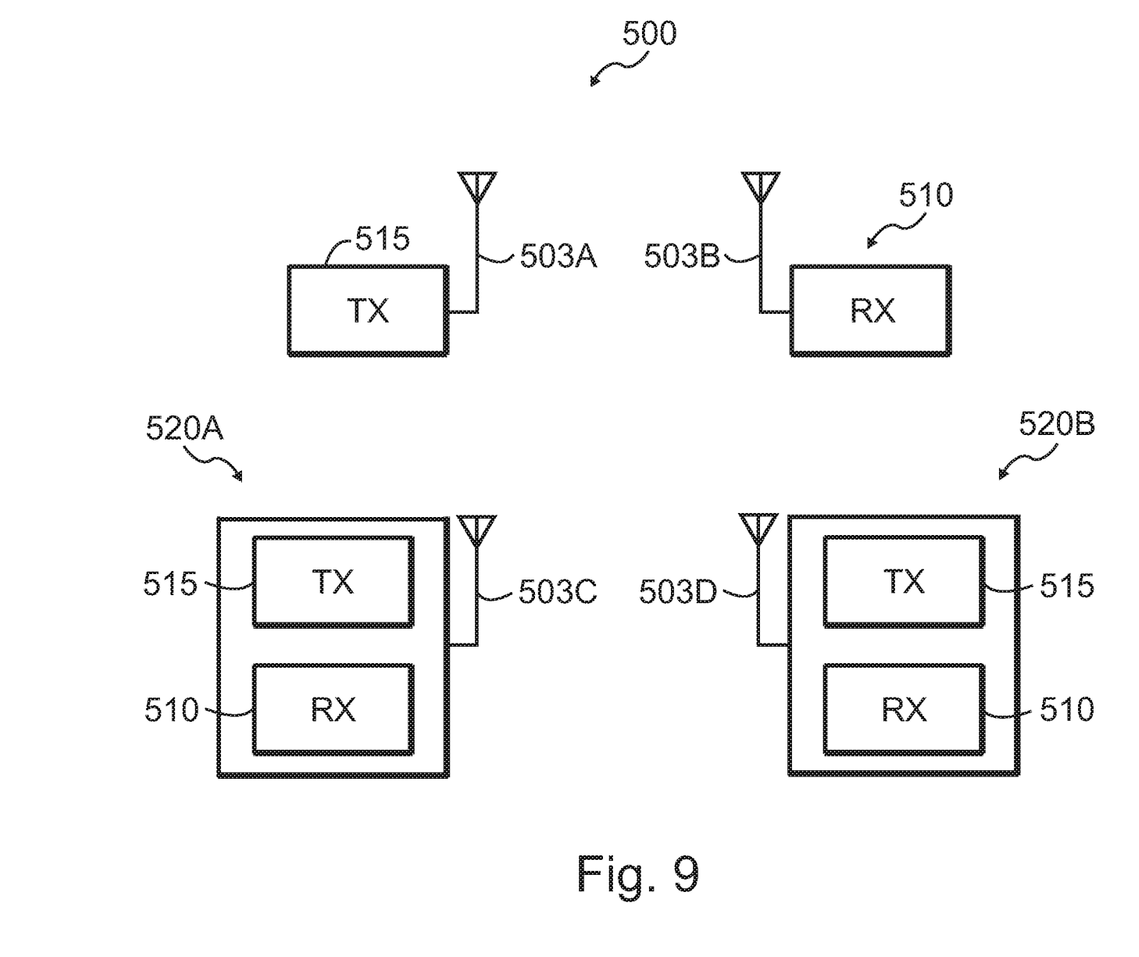
FIG. 9 shows a system for radio communication according to an exemplary embodiment.

RF apparatus, such as RF receivers according to exemplary embodiments may be used in a variety of communication arrangements, systems, sub-systems, networks, etc., as desired. FIG. 9 shows a system 500 for radio communication according to an exemplary embodiment.

System 100 includes a transmitter 515, coupled to antenna 503A. Via antenna 503A, transmitter 515 transmits RF signals. The RF signals may be received by receiver 510, described above. In addition, or alternatively, transceiver 520A and/or transceiver 520B might receive (via receiver 510) the transmitted RF signals.

In addition to receive capability, transceiver 520A and transceiver 520B can also transmit RF signals. The transmitted RF signals might be received by receiver 510, either in the stand-alone receiver, or via the receiver circuitry of the non-transmitting transceiver.

Other systems or sub-systems with varying configuration and/or capabilities are also contemplated. For example, in some exemplary embodiments, two or more transceivers (e.g., transceiver 520A and transceiver 520B) might form a network, such as an ad-hoc network. As another example, in some exemplary embodiments, transceiver 520A and transceiver 520B might form part of a network, for example, in conjunction with transmitter 515.

RF apparatus, such as receivers, an example of which is RF receiver 510 described above, may be used in a variety of circuits, blocks, subsystems, and/or systems. For example, in some embodiments, such RF receivers may be integrated in an IC, such as a microcontroller unit (MCU). FIG. 10 shows a block diagram of an IC 550 according to an exemplary embodiment.

IC 550 constitutes or includes an MCU. IC 550 includes a number of blocks (e.g., processor(s) 565, data converter 605, I/O circuitry 585, etc.) that communicate with one another using a link 560. In exemplary embodiments, link 560 may constitute a coupling mechanism, such as a bus, a set of conductors or semiconductor elements (e.g., traces, devices, etc.) for communicating information, such as data, commands, status information, and the like.

IC 550 may include link 560 coupled to one or more processors 565, clock circuitry 575, and power management circuitry or power management unit (PMU) 580. In some embodiments, processor(s) 565 may include circuitry or blocks for providing information processing (or data processing or computing) functions, such as central-processing units (CPUs), arithmetic-logic units (ALUs), and the like. In some embodiments, in addition, or as an alternative, processor(s) 565 may include one or more DSPs. The DSPs may provide a variety of signal processing functions, such as arithmetic functions, filtering, delay blocks, and the like, as desired.

Clock circuitry 575 may generate one or more clock signals that facilitate or control the timing of operations of one or more blocks in IC 550. Clock circuitry 575 may also control the timing of operations that use link 560, as desired. In some embodiments, clock circuitry 575 may provide one or more clock signals via link 560 to other blocks in IC 550.

In some embodiments, PMU 580 may reduce an apparatus's (e.g., IC 550) clock speed, turn off the clock, reduce power, turn off power, disable (or power down or place in a lower power consumption or sleep or inactive or idle state), enable (or power up or place in a higher power consumption or normal or active state) or any combination of the foregoing with respect to part of a circuit or all components of a circuit, such as one or more blocks in IC 550. Further, PMU 580 may turn on a clock, increase a clock rate, turn on power, increase power, or any combination of the foregoing in response to a transition from an inactive state to an active state (including, without limitation, when processor(s) 565 make a transition from a low-power or idle or sleep state to a normal operating state).

Link 560 may couple to one or more circuits 600 through serial interface 595. Through serial interface 595, one or more circuits or blocks coupled to link 560 may communicate with circuits 600. Circuits 600 may communicate using one or more serial protocols, e.g., SMBUS, I²C, SPI, and the like, as person of ordinary skill in the art will understand.

Link 560 may couple to one or more peripherals 590 through I/O circuitry 585. Through I/O circuitry 585, one or more peripherals 590 may couple to link 560 and may therefore communicate with one or more blocks coupled to link 560, e.g., processor(s) 565, memory circuit 625, etc.

In exemplary embodiments, peripherals 590 may include a variety of circuitry, blocks, and the like. Examples include I/O devices (keypads, keyboards, speakers, display devices, storage devices, timers, sensors, etc.). Note that in some embodiments, some peripherals 590 may be external to IC 550. Examples include keypads, speakers, and the like.

In some embodiments, with respect to some peripherals, I/O circuitry 585 may be bypassed. In such embodiments, some peripherals 590 may couple to and communicate with link 560 without using I/O circuitry 585. In some embodiments, such peripherals may be external to IC 550, as described above.

Link 560 may couple to analog circuitry 620 via data converter(s) 605. Data converter(s) 605 may include one or more ADCs 605A and/or one or more DACs 605B.

ADC(s) 605A receive analog signal(s) from analog circuitry 620, and convert the analog signal(s) to a digital format, which they communicate to one or more blocks coupled to link 560. Conversely, DAC(s) 605B receive digital signal(s) from one or more blocks coupled to link 560, and convert the digital signal(s) to analog format, which they communicate to analog circuitry 620.

Analog circuitry 620 may include a wide variety of circuitry that provides and/or receives analog signals. Examples include sensors, transducers, and the like, as person of ordinary skill in the art will understand. In some embodiments, analog circuitry 620 may communicate with circuitry external to IC 550 to form more complex systems, sub-systems, control blocks or systems, feedback systems, and information processing blocks, as desired.

Control circuitry 570 couples to link 560. Thus, control circuitry 570 may communicate with and/or control the operation of various blocks coupled to link 560 by providing control information or signals. In some embodiments, control circuitry 570 also receives status information or signals from various blocks coupled to link 560. In addition, in some embodiments, control circuitry 570 facilitates (or controls or supervises) communication or cooperation between various blocks coupled to link 560.

In some embodiments, control circuitry 570 may initiate or respond to a reset operation or signal. The reset operation may cause a reset of one or more blocks coupled to link 560, of IC 550, etc., as person of ordinary skill in the art will understand. For example, control circuitry 570 may cause PMU 580, and circuitry such as receiver 510, to reset to an initial or known state.

In exemplary embodiments, control circuitry 570 may include a variety of types and blocks of circuitry. In some embodiments, control circuitry 570 may include logic circuitry, finite-state machines (FSMs), or other circuitry to perform operations such as the operations described above. As noted above, in some embodiments, control circuitry 570 and/or processor(s) 565 may be used to implement, either in whole or in part, interference detection circuit 34 (described above) in RF receiver 510, as desired. Doing so would, as noted above, save semiconductor die area because dedicated hardware to implement (in part or in whole) the functionality of interference detection circuit 34 may be omitted from receiver 510. Thus, the functionality of interference detection circuit 34 may be implemented in whole or in part by dedicated hardware, in control circuitry 570 (and appropriate firmware, if applicable), and/or processor(s) 565 (and appropriate firmware, if applicable), as desired, and as persons of ordinary skill in the art will understand.

Communication circuitry 640 couples to link 560 and also to circuitry or blocks (not shown) external to IC 550. Through communication circuitry 640, various blocks coupled to link 560 (or IC 550, generally) can communicate with the external circuitry or blocks (not shown) via one or more communication protocols. Examples of communications include USB, Ethernet, and the like. In exemplary embodiments, other communication protocols may be used, depending on factors such as design or performance specifications for a given application, as person of ordinary skill in the art will understand.

As noted, memory circuit 625 couples to link 560. Consequently, memory circuit 625 may communicate with one or more blocks coupled to link 560, such as processor(s) 565, control circuitry 570, I/O circuitry 585, etc.

Memory circuit 625 provides storage for various information or data in IC 550, such as operands, flags, data, instructions, and the like, as persons of ordinary skill in the art will understand. Memory circuit 625 may support various protocols, such as double data rate (DDR), DDR2, DDR3, DDR4, and the like, as desired.

In some embodiments, memory read and/or write operations by memory circuit 625 involve the use of one or more blocks in IC 550, such as processor(s) 565. A direct memory access (DMA) arrangement (not shown) allows increased performance of memory operations in some situations. More specifically, DMA (not shown) provides a mechanism for performing memory read and write operations directly between the source or destination of the data and memory circuit 625, rather than through blocks such as processor(s) 565.

Memory circuit 625 may include a variety of memory circuits or blocks. In the embodiment shown, memory circuit 625 includes non-volatile (NV) memory 635. In addition, or instead, memory circuit 625 may include volatile memory (not shown), such as random access memory (RAM). NV memory 635 may be used for storing information related to performance, control, or configuration of one or more blocks in IC 550. For example, NV memory 635 may store configuration information related to receiver 510, such as parameters, firmware, etc., relating to interference detection.

Various circuits and blocks described above and used in exemplary embodiments may be implemented in a variety of ways and using a variety of circuit elements or blocks. For example, PGA 18, IFPD circuit 20, decimation and filtering circuit 24, SRC circuit 26, demodulator 28, packet handler circuit 30, DSA circuit 32, interference-detection circuit 34, AGC circuit 36, and at least parts of ADC 22, may generally be implemented using digital circuitry. The digital circuitry may include circuit elements or blocks such as gates, digital multiplexers (MUXs), latches, flip-flops, registers, finite state machines (FSMs), processors, programmable logic (e.g., field programmable gate arrays (FPGAs) or other types of programmable logic), arithmetic-logic units (ALUs), standard cells, custom cells, custom analog cells, etc., as desired, and as persons of ordinary skill in the art will understand. In addition, analog circuitry or mixed-signal circuitry or both may be included, for instance, power converters, discrete devices (transistors, capacitors, resistors, inductors, diodes, etc.), and the like, as desired. The analog circuitry may include bias circuits, decoupling circuits, coupling circuits, supply circuits, current mirrors, current and/or voltage sources, filters, amplifiers, converters, signal processing circuits (e.g., multipliers), detectors, transducers, discrete components (transistors, diodes, resistors, capacitors, inductors), analog MUXs and the like, as desired, and as persons of ordinary skill in the art will understand. The mixed-signal circuitry may include analog to digital converters (ADCs), digital to analog converters (DACs), etc.) in addition to analog circuitry and digital circuitry, as described above, and as persons of ordinary skill in the art will understand. The choice of circuitry for a given implementation depends on a variety of factors, as persons of ordinary skill in the art will understand. Such factors include design specifications, performance specifications, cost, IC or device area, available technology, such as semiconductor fabrication technology), target markets, target end-users, etc.

Various circuits and blocks described above and used in exemplary embodiments may be implemented in a variety of ways and using a variety of circuit elements or blocks. For example, at least part of LNA 12, mixer 14, LO 16, RFPD circuit 38, and parts of ADC 22, may generally be implemented using analog circuitry. The analog circuitry may include bias circuits, decoupling circuits, coupling circuits, supply circuits, current mirrors, current and/or voltage sources, filters, amplifiers, converters, signal processing circuits (e.g., multipliers), sensors or detectors, transducers, discrete components (transistors, diodes, resistors, capacitors, inductors), analog MUXs, and the like, as desired, and as persons of ordinary skill in the art will understand. In addition, digital circuitry or mixed-signal circuitry or both may be included. The digital circuitry may include circuit elements or blocks such as gates, digital multiplexers (MUXs), latches, flip-flops, registers, finite state machines (FSMs), processors, programmable logic (e.g., field programmable gate arrays (FPGAs) or other types of programmable logic), arithmetic-logic units (ALUs), standard cells, custom cells, custom analog cells, etc., as desired, and as persons of ordinary skill in the art will understand. The mixed-signal circuitry may include analog to digital converters (ADCs), digital to analog converters (DACs), etc.) in addition to analog circuitry and digital circuitry, as described above, and as persons of ordinary skill in the art will understand. The choice of circuitry for a given implementation depends on a variety of factors, as persons of ordinary skill in the art will understand. Such factors include design specifications, performance specifications, cost, IC or device area, available technology, such as semiconductor fabrication technology), target markets, target end-users, etc.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to the embodiments in the disclosure will be apparent to persons of ordinary skill in the art. Accordingly, the disclosure teaches those skilled in the art the manner of carrying out the disclosed concepts according to exemplary embodiments, and is to be construed as illustrative only. Where applicable, the figures might or might not be drawn to scale, as persons of ordinary skill in the art will understand.

The particular forms and embodiments shown and described constitute merely exemplary embodiments. Persons skilled in the art may make various changes in the shape, size and arrangement of parts without departing from the scope of the disclosure. For example, persons skilled in the art may substitute equivalent elements for the elements illustrated and described. Moreover, persons skilled in the art may use certain features of the disclosed concepts independently of the use of other features, without departing from the scope of the disclosure.

The invention claimed is:

1. An apparatus, comprising:
a radio-frequency (RF) receiver, comprising:
an automatic gain-control (AGC) circuit to use a gain signal to set a gain of front-end circuitry of the RF receiver; and
an interference-detection circuit to use a value of the gain signal to detect an interference signal,
wherein the interference-detection circuit detects an interference signal when the value of the gain signal is below a first pre-determined threshold while a received signal strength indicator (RSSI) value of the RF receiver stays below a second pre-determined threshold.

2. The apparatus according to claim 1, wherein the interference signal comprises an out-of-band (OOB) interference signal.

3. The apparatus according to claim 2, wherein interference-detection circuit detects an interference signal when a gain reduction is below a first pre-determined threshold while a channel power (CHPWR) value of the RF receiver stays below a second pre-determined threshold.

4. The apparatus according to claim 1, wherein the gain signal indicates a gain setting of the AGC circuit.

5. The apparatus according to claim 1, wherein the front-end circuitry of the RF receiver comprises a low-noise amplifier (LNA) and a programmable-gain amplifier (PGA).

6. The apparatus according to claim 1, wherein a received signal strength indicator (RSSI) value of the RF receiver and detection of a synchronization word (sync word) in the RF receiver to detect a co-channel interference signal.

7. The apparatus according to claim 1, wherein the interference-detection circuit uses packet-sequence numbers (PSNs) to detect a replay attack.

8. The apparatus according to claim 1, wherein the RF receiver uses a trigger signal from a digital signal arrival (DSA) circuit to determine whether the inference signal uses a different modulation scheme than a desired RF signal or presence of intermodulation interference.

9. The apparatus according to claim 1, wherein the RF receiver uses a received signal strength indicator (RSSI) value of the RF receiver to detect payload interference.

10. The apparatus according to claim 1, wherein the RF receiver further includes a low-noise amplifier (LNA) and a programmable-gain amplifier (PGA), and wherein the AGC circuit is coupled to the LNA and the PGA.

11. A method of detecting interference in a radio-frequency (RF) receiver, the method comprising detecting an interference signal by using received signal strength indicator (RSSI) value of the RF receiver, and by using (a) a gain signal from an automatic gain-control (AGC) circuit of the RF receiver, or (b) detection of a synchronization word (sync word) in the RF receiver, wherein detecting the interference signal comprises determining when the RSSI value of the RF receiver is below a first pre-determined threshold while a value of the gain signal is below a second pre-determined threshold.

12. The method according to claim 11, wherein detecting the interference signal further comprises using the RSSI value of the RF receiver and the gain signal from the AGC circuit of the RF receiver to detect an out-of-band (OOB) interference signal.

13. The method according to claim 11, wherein detecting the interference signal further comprises using the RSSI value of the RF receiver and the detection of a synchronization word (sync word) in the RF receiver to detect a co-channel interference signal.

14. The method according to claim 13, wherein detecting the interference signal further comprises determining when the RSSI value of the RF receiver exceeds a pre-determined threshold.

15. The method according to claim 11, wherein detecting the interference signal further comprises packet-sequence numbers (PSNs) to detect a replay attack.

16. The method according to claim 11, wherein detecting the interference signal further comprises using: (a) a trigger signal from a digital signal arrival (DSA) circuit of the RF receiver to determine whether the inference signal uses a different modulation scheme than a desired RF signal or presence of intermodulation interference, and/or (b) using a received signal strength indicator (RSSI) value of the RF receiver to detect payload interference.

17. The method according to claim 11, wherein detecting a co-channel interference signal further comprises detecting when the gain signal is below a first pre-determined threshold while a channel power (CHPWR) value of the RF receiver stays below a second pre-determined threshold.

18. The method according to claim 11, wherein the gain signal indicates a gain setting of the AGC circuit.

19. An apparatus, comprising:
   a radio-frequency (RF) receiver, comprising:
      an automatic gain-control (AGC) circuit to use a gain signal to set a gain of front-end circuitry of the RF receiver; and
      an interference-detection circuit to use a value of the gain signal to detect an interference signal,
      wherein the interference-detection circuit detects an interference signal when a gain reduction is below a first pre-determined threshold while a channel power (CHPWR) value of the RF receiver stays below a second pre-determined threshold.

20. The apparatus according to claim 19, wherein the interference signal comprises an out-of-band (OOB) interference signal.

* * * * *